(12) United States Patent
Brusniak

(10) Patent No.: US 9,253,565 B2
(45) Date of Patent: Feb. 2, 2016

(54) SYSTEM AND CHARACTERIZATION OF NOISE SOURCES USING ACOUSTIC PHASED ARRAYS AND TIME SERIES CORRELATIONS

(75) Inventor: Leon Brusniak, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 1601 days.

(21) Appl. No.: 12/164,882

(22) Filed: Jun. 30, 2008

(65) Prior Publication Data

US 2009/0326870 A1    Dec. 31, 2009

(51) Int. Cl.
*H04B 15/00*     (2006.01)
*H04R 3/00*      (2006.01)
*H04B 1/10*      (2006.01)

(52) U.S. Cl.
CPC .......... *H04R 3/005* (2013.01); *H04B 1/10* (2013.01); *H04R 2410/01* (2013.01); *H04R 2430/20* (2013.01)

(58) Field of Classification Search
CPC ....................................................... H04B 1/10
USPC ............................................................. 702/191
See application file for complete search history.

(56) References Cited

U.S. PATENT DOCUMENTS

| 4,965,732 | A  | * | 10/1990 | Roy et al. | G01S 3/14 342/147 |
| 7,415,063 | B1 | * | 8/2008  | Ruffa      | H04B 17/345 375/227 |
| 7,739,899 | B1 | * | 6/2010  | Holland    | G01M 3/24 73/40.5 R |
| 2006/0071668 | A1 |  | 4/2006 | Senibi et al. | |

OTHER PUBLICATIONS

Lu, H. Y. "An Empirical Model for Prediction of Coaxial Jet Noise in Ambient Flow", AIAA 10th Aeroacoustics Conference, Jul. 1986, Seattle, Washington, 10 pages.

* cited by examiner

*Primary Examiner* — Hyun Park

(57) ABSTRACT

A method for detecting the presence of a noise signal within a noise measurement field, where the noise measurement field includes a noise signal emanating from a noise source, and where the noise signal is mixed with extraneous noise existing within the noise measurement field. The method involves using a plurality of acoustic transducers arranged in a plurality of arrays to monitor the noise measurement field at a plurality of spatially separated locations. Outputs of the transducers are sampled to generate time series data. The time series data is processed to identify whether the noise signal is present.

18 Claims, 4 Drawing Sheets

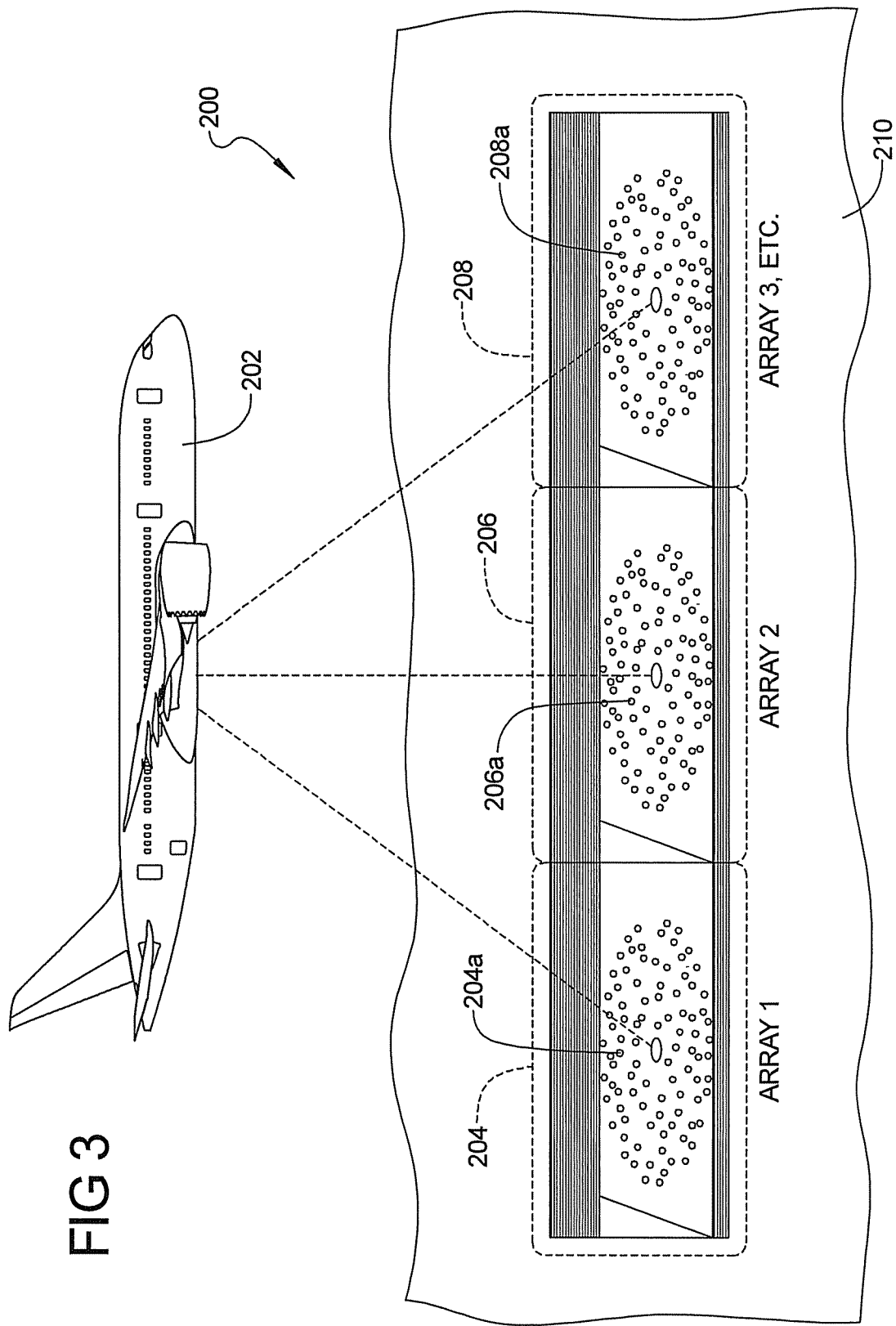

SYSTEM AND CHARACTERIZATION OF NOISE SOURCES USING ACOUSTIC PHASED ARRAYS AND TIME SERIES CORRELATIONS

FIELD

The present disclosure relates to systems and method for analyzing noise emitted from one or more noise sources, and more particularly to a system and method for processing time series data obtained from a plurality of acoustic arrays to analyze one complex noise source, or a plurality of complex, spatially separated and/or distributed noise sources.

BACKGROUND

The statements in this section merely provide background information related to the present disclosure and may not constitute prior art.

In noise detection and analysis systems, acoustic transducers such as microphones are employed to collect noise signals emanating from one or more noise sources. However, single, omni-directional microphone measurements are incapable of discriminating between different noise signals emanating from multiple, and typically spatially separated and/or distributed, noise sources. The presence of multiple noise sources severely complicates the analysis of correlation data from the microphones.

An example of a difficult noise correlation problem is the noise radiated simultaneously from the inlet and exhaust nozzles of a jet aircraft engine, that is, two spatially separated noise sources. The inlet/exhaust noise sources separately radiate outwards to the external measurement field. If the inlet noise and the exhaust noise contain a noise signal emanating from a common source, for example a particular component or surface within the jet engine, then they can have a measurable degree of correlation in the external measurement field. The first challenge is thus determining whether or not the inlet and exhaust noise sources are correlated. This is complicated by noise from other various components of the engine that emanate from the engine or the downstream exhaust flow and are picked up by the microphones, as well as extraneous noise sources (e.g., vehicles operating in the area; aircraft flying overhead; construction work) existing in the measurement environment that is picked up by the microphones. These forms of extraneous noise, both coming from within and external to the engine and from sources remote from the engine, are picked up by the microphones and operate to "mask" the existence of any noise signal having a correlation that is picked up by the microphones.

In the above described example, even if a correlation between two noise signals, picked up by two spatially separated microphones, is determined to exist, then the next challenge is to determine the locations in the external measurement field at which the correlation values are a maximum (or of meaningful high level). Still another challenge is the determination of the spatial extent (in the measurement field) of the correlation which arises from spatially distributed noise sources. An example of such spatially distributed noise sources might be correlated noise sources along a wing flap trailing edge; correlated noise sources within the jet mixing region downstream of the jet engine exhaust nozzle; etc.

From the foregoing, it will be appreciated that determining when a correlation exists between two spatially separated noise sources presents significant challenges. Determining the locations within the measurement field where the correlations are a maximum, as well as the spatial extent within the measurement field where the maximum correlation exists, represent even further significant challenges with presently available noise monitoring/measuring systems and methods.

SUMMARY

In one aspect the present disclosure relates to a method for detecting the presence of a noise signal within a noise measurement field, where the noise measurement field includes a noise signal emanating from a noise source, and where the noise signal is mixed with extraneous noise existing within the noise measurement field. The method may comprise: using a plurality of acoustic transducers arranged in a plurality of arrays to monitor the noise measurement field at a plurality of spatially separated locations; sampling outputs from said acoustic transducers to generate time series data; and processing said time series data to identify whether said noise signal is present.

In another aspect a method is disclosed for determining a relationship between acoustic noise signals originating from acoustic waves radiating from multiple sources, where the multiple noise sources are located within a noise measurement field. The method may comprise: using a plurality of acoustic transducers arranged in first and second arrays to monitor the noise measurement field at a plurality of spatially separate locations within the noise measurement field; sampling electrical signals output from said acoustic transducers and generating time varying signals therefrom; processing said time varying signals by aligning the signals originating at the same time from a given spatial location into a delayed-time representation data set and generating an averaged time varying signal from each respective delayed-time representation data set from each of said first and second arrays; and analyzing said averaged time varying signals to determine a correlation between noise signals originating from said first and second arrays.

In another aspect the present disclosure provides a system for determining a relationship between acoustic noise signals originating from acoustic waves radiating from multiple sources, where the multiple noise sources are located within a noise measurement field. The system may comprise: a plurality of acoustic transducers arranged as acoustic phased array antennas in first and second arrays to monitor the noise measurement field at a plurality of spatially separate locations within the noise measurement field, the acoustic transducers adapted to generate electrical signals in response to reception of acoustic signals present within the noise measurement field; an array processing subsystem including beamforming algorithms to generate time series data therefrom; and a signal processing subsystem adapted to process said time series data and to generate a first averaged time varying signal associated with an output said first array, and a second time varying signal associated with an output from said second array, and further adapted to analyze said first and second averaged time varying signals to determine a correlation between noise radiating from said multiple sources.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a perspective view of another implementation of a system in accordance with the present disclosure in which a plurality of beam steered phased arrays, each having randomly distributed acoustic spiral arm transducers, are used to monitor noise signals emanating from a moving mobile platform, in this example a jet aircraft.

DETAILED DESCRIPTION

The following description is merely exemplary in nature and is not intended to limit the present disclosure, application, or uses.

Figure 1:
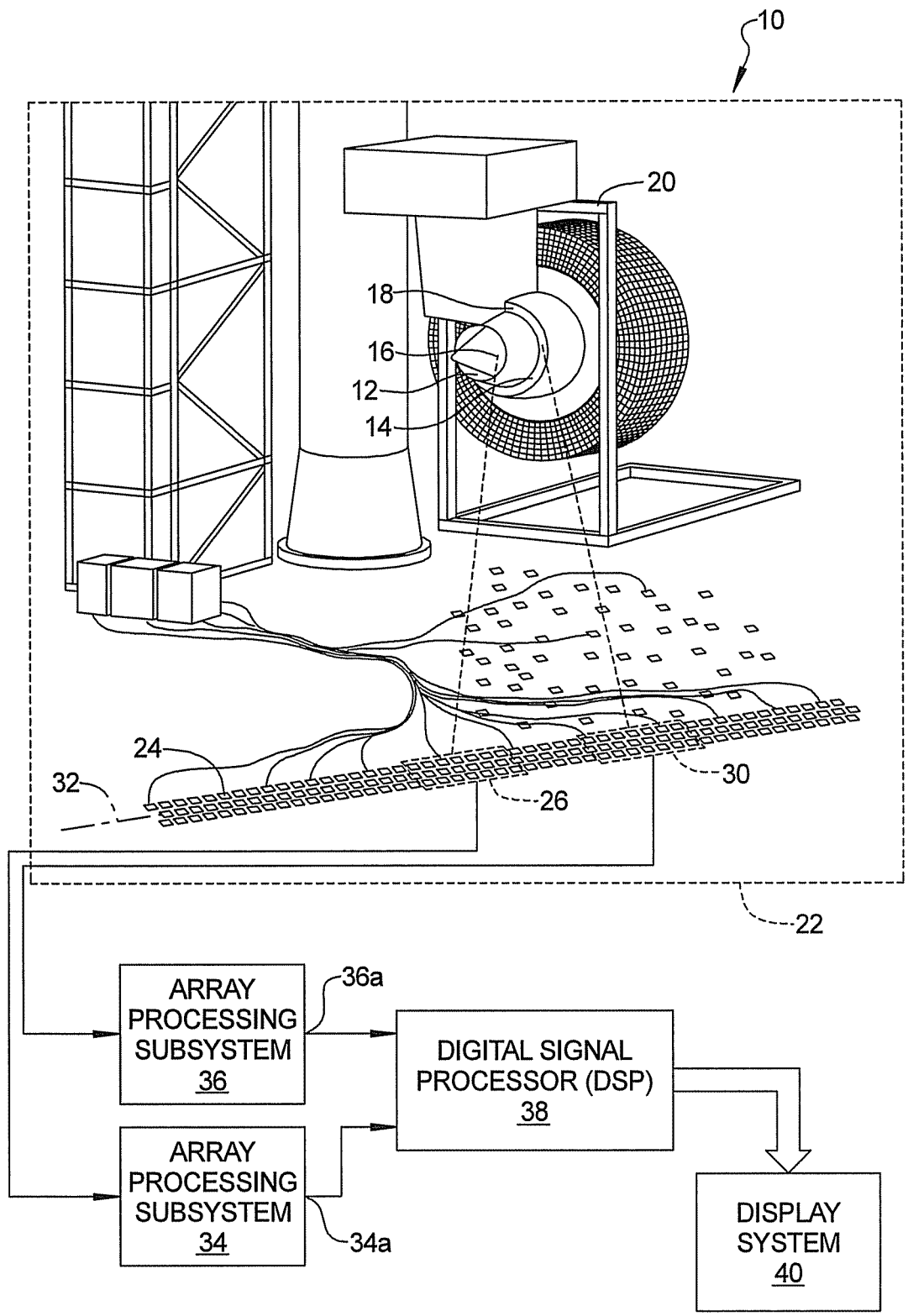
FIG. 1 is a perspective view of a system in accordance with one embodiment of the present disclosure set up to monitor noise emanating from two spatially separated locations of a jet engine.

Referring to FIG. 1, a system 10 for analyzing one noise source, or a plurality of spatially separated noise sources, is illustrated. In this example two spatially separated noise sources 12 and 14 are shown being at the primary exhaust nozzle 16 and fan exhaust nozzle 18, respectively, of a jet engine 20 while the engine is operating. The noise sources 12 and 14 can be thought of as being positioned within a noise field shown in dashed lines 22. The noise field 22 forms a complex noise field that includes not only the noise emanating from the first and second noise sources 12 and 14 but also from extraneous noise sources such as the engine generated noise in the downstream exhaust region, wind, other vehicles operating in a vicinity of the noise field 22, aircraft and/or rotorcraft flying over the noise field, just to name a few. Thus, it will be appreciated that while two primary noise sources 12 and 14 are present in the noise field 22, typically noise will exist from one or more additional sources as well.

It will also be appreciated that the present system 10 is not limited to use in analyzing only two distinct, spatially separated noise sources, but rather is equally well suited to analyzing one, three, four or more distinct and/or spatially distributed noise sources. Furthermore, the noise sources do not need to be stationary, as illustrated in FIG. 1, but rather could involve moving mobile platforms, as will be discussed in connection with FIG. 3. The system 10 and method of the present disclosure is expected to find particular utility in analyzing noise emitted and/or emanating from various areas or components of a jet aircraft. However, the system 10 and method of the present disclosure is equally well suited to analyzing noise associated with the operation of any form of fixed structure, or any form of mobile platform such as a land vehicle (car, truck, or bus) or a train. Still other potential applications may include analyzing noise associated with the operation of other forms of airborne mobile platforms such as rotorcraft, spacecraft and various forms of unmanned airborne vehicles. Still other potential applications may include analyzing noise associated with the operation of surface and underwater marine vessels.

In FIG. 1 the system 10 includes a plurality of acoustic transducers 24 that can be selected by the system 10 to form one, two or more acoustic phased array antennas. For convenience, the transducers 24 in FIG. 1 are shown forming two arrays, i.e., a first acoustic phased array antenna 26 (hereinafter simply the "first array" 26) and a second acoustic phased array antenna 30 (hereinafter "second array" 30). The first and second arrays 26 and 30 are further arranged in a desired orientation, for example along a longitudinal line or path 32. However, the arrays 26 and 30 do not necessarily need to be arranged along a longitudinal path, as will be discussed further in the following paragraphs. Instead, the first and second arrays 26 and 30 could be located at any position within the noise field 22, or possibly to form a dome or sphere around the noise source(s). The distance from each acoustic transducer 24 to the noise source is further known or assumed.

In the general case, beamforming measurements can first be made over a volume in space in order to determine the spatial extent and locations of noise sources. The beamforming spatial region may be restricted to, for example, a plane (e.g., a plane which cuts through the engine axis) or to a single line of interest (e.g., the engine axis centerline/rotation axis).

The acoustic transducers 24 are also preferably spatially separated from one another to provide non-redundant acoustic transducer-to-acoustic transducer spacing between any two of the acoustic transducers 24. This non-redundant spacing technique inhibits spatial aliasing (i.e., false images) as is well known in the art.

It will be appreciated that while the arrays 26 and 30 are shown adjacent to one another, that they could also be arranged to overlap one another by a desired amount. This would allow for the determination of the relationship between the beamformed time series outputs of each of the arrays 26 and 30 when the relative spatial location of each array is changed. For example, with reference to FIG. 1A, the locations of transducers 24 of array 26 could be fixed, while the transducers 24 that are selected to form array 30 are varied. As an illustration of this, in FIG. 1A the initial selection of transducers 24 for array 30 is selected to be the exact same transducers as those that are designated to form array 26, as indicated by dashed line A. Thus, the 9 transducers 24 (represented by squares) within dashed line A will be considered as all belonging to both array 26 and array 30. In this case the outputs of both arrays 26,30 will be identical and there will be a perfect relationship between the beamformed time series output of each array.

Figure 1A:
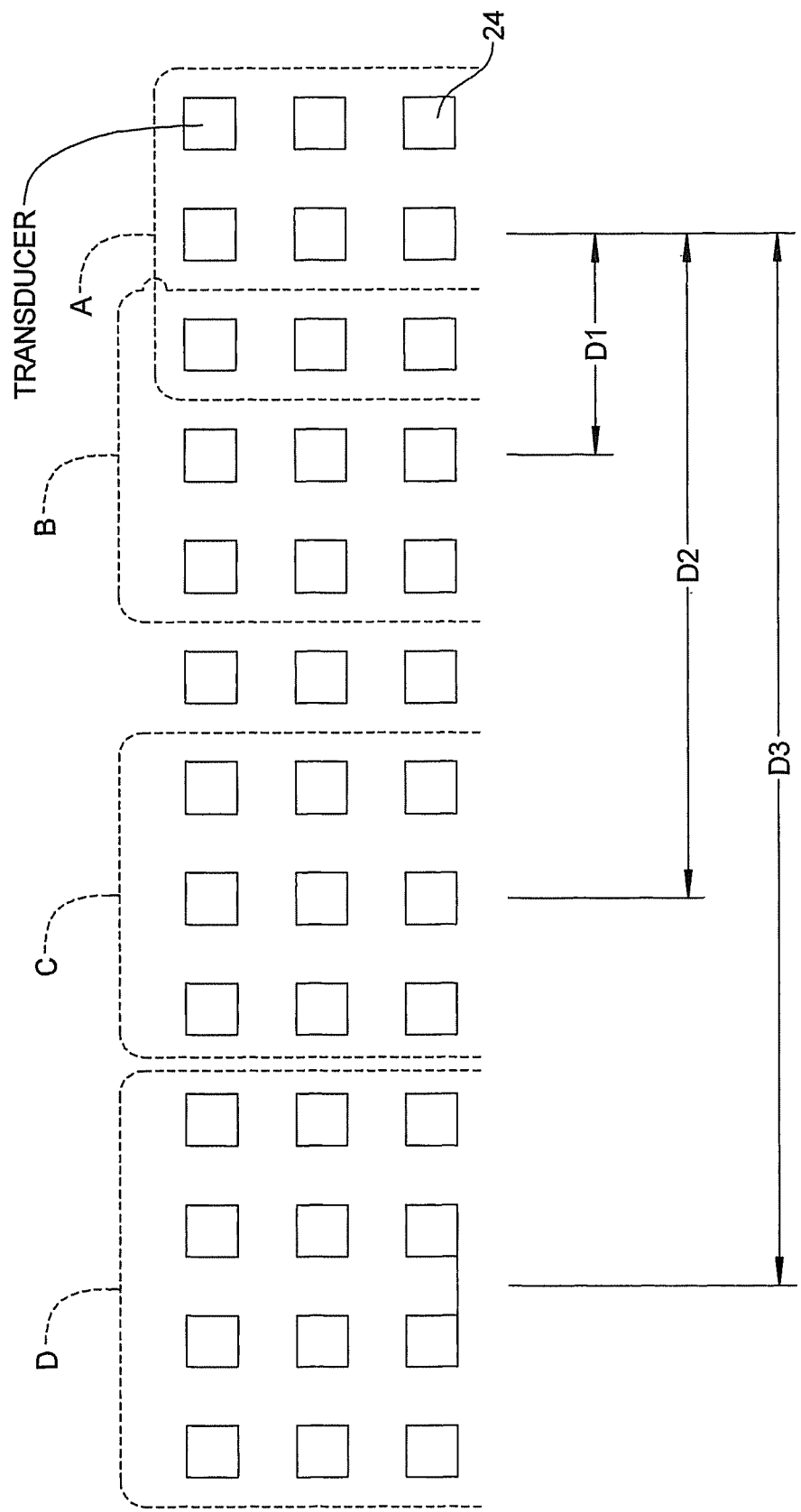
FIG. 1A is a diagram illustrating how the transducers that make up the two arrays may be selected.

The next selection of transducers 24 for array 30 could then include that group of transducers shown in FIG. 1A as being circled by dashed line B. This new selection of transducers 24 for array 30 is similar to the initial selection but now only overlaps a portion of array 26 (now designated by dashed line A), and thus shares only a portion of the transducers used for array 26. In general, the relationship (i.e., magnitude of correlation) between the beamformed time series output of array 30 (represented by dashed lines B) and the output of the transducers 24 forming array 26 will typically now be less than in the preceding case. The spatial distance D1 represents the spatial distance between the phase centers of the two arrays 26 and 30. It will be appreciated, however, that any subset of microphones can be used to define an array. Both the number of microphones and length of the array subsets can be varied.

Subsequently, a new group of transducers 24 may be selected to form array 30, as indicated by dashed line C, and will have a spatial distance from array 26 represented by line D2. The output from array 30 (represented by dashed lines C) will have a correlation with the output from array 26 that may be even smaller yet than the previously selected transducers 24 (i.e., those indicated by dashed lines B). Finally, another group of transducers 24 within dashed lines D may be selected to form the array 30. This group will have a spatial distance D3 separating the phase centers of array 30 and array 26. The magnitude of the correlation between the outputs of array 30 and array 26 may be even less than the previous selection of transducers 24 for the array 30 (i.e., those represented by dashed line C). This process thus yields the variation in space of the relationship between the array 30 output beamformed time series and the stationary (fixed location) array 26 beamform output time series. It will be appreciated that while in this example the transducers 24 selected for the array 26 have not changed, that the locations and selection of the transducers used for array 26 could also be varied.

In FIG. 1 the system 10 also includes a first array processing subsystem 34 and a second array processing subsystem 36. The first array processing subsystem 34 includes suitable array processing algorithms that incorporate beamforming algorithms to generate beamformed time series data from the electrical output signals provided by each of the transducers 24 that form the first array 26. Similarly, the second array processing subsystem 36 also includes suitable array processing algorithms that incorporate beamforming algorithms to generate beamformed time series data from the electrical output signals generated by the transducers 24 that are forming the second acoustic array 30.

The electrical output signals from all transducers 24 are sampled simultaneously and recorded to computer hard disk. The first array processing subsystem 34 selects the electrical output signals from all of the transducers 24 of the first array 26 to generate the acoustic transducers 24 time series data (i.e., time varying electrical signals) from the first array 26, while the second array processing subsystem 36 samples the electrical output signals (i.e., time varying electrical signals) from the second array 30. In effect, the time varying signals from the acoustic transducers 24 of each array 26, 30 are delayed in time in such a manner that an acoustic wave (i.e., noise wave) propagating from a given assumed noise source location will be registered at the same relative instant in the delayed-time representation of the data from the transducers 24 of array 26, and at the same instant in the delayed-time representation of the data from the transducers 24 forming array 30.

Thus, it will be understood that typically, the data is acquired simultaneously from all of the transducers 24 and then the data is saved to a computer disk. After the data has been written to disk, then one can then select whatever subsets of transducers one would like to employ for the first and second array correlation analyses. As noted later herein, though, one could imagine a "real-time system" for which the first and second arrays are mobile arrays and where the location of one of the arrays is continually changed in order to probe the noise field in order to determine the two array locations at which a desired correlation exists between the beamformed time series data output by the two arrays.

The delayed-time representation signals from all transducers 24 of array 26 are then summed together, and the signals from the transducers 24 of array 30 are separately also summed together. Since the signal of interest (the propagating noise wave) occurs at the same time instant in the delayed-time representation, the summation will produce a summed (reinforced) representation of the signal of interest, whereas all other signal components which are not in phase with the signal of interest will be suppressed. The values of the summed signals are then divided by the number of transducers used in the process (i.e., for each array 26 or 30) in order to provide the average (beamformed) time series representation of the signal arriving from the assumed source location.

By averaging the time series data from the first array processing subsystem 34, the first averaged time varying signal effectively provides a spatially filtered representation of the noise signal emanating from first noise source location 12 with noise from other sources being suppressed. Also, this serves to reinforce the acoustic waves radiating from the first noise source location 12 that are picked up by the acoustic transducers 24 and used to provide the data that forms the first averaged time varying signal (i.e., beamformed time series) from array 26. Similarly, the second averaged time varying signal from array 30 provides a spatially filtered representation of the noise signal emanating from the second noise source location 14 and suppresses noise from other sources besides the second noise source 14.

This operation effectively serves to "beam-steer" the time series data being generated by each array processing subsystem 34 and 36 in the time domain, which results in beamformed time series data (having amplitude and a phase) in which noise sources other than the noise source of interest (i.e., noise sources 12 and 14) have been removed. This is a well-known method familiar to those skilled in the art and is referred to as "delay-and-sum" beamforming. However, the system and method of the present disclosure is not limited to the time-domain delay-and-sum beamforming methodology, but may just as well include frequency-domain beamforming methods and techniques. These methods allow for measurements of the noise originating at a location of interest to be reinforced while simultaneously suppressing the contributions from noise sources originating at locations other than the location of interest. It will be appreciated also that this beam-steering operation may instead be performed in the frequency domain through the vector product of the complex conjugate of the frequency domain steering vector with the vector of microphone spectral levels (both amplitude and phase) at a given frequency.

It will also be appreciated that the transducers 24 used to form the arrays 26 and 30 preferably all remain physically fixed in location (relative to the ground surface) during the entire test. This enables beamforming to be accomplished by the transducers 24. Beamforming is a significant advantage because the transducers 24 do not need to be physically moved around (i.e., physically "steered") during tests (although such could be done).

It will also be appreciated that in the industry, hand held/portable phased array systems are being developed and used for quick and easy localization of noise sources for a wide variety of applications (automobile engine/tire/sideview mirror noise, office room noise, etc.). The present system and method could easily be used with such devices. For example, one could place one of the portable arrays at one location and then use a hand held second array to move about the noise field until a desired correlation is achieved between the beamformed time series being output by the two arrays.

The system 10 further includes a signal processing subsystem 38 that may comprise a digital signal processing (DSP) subsystem. For convenience, this subsystem will be referred to simply as the "DSP subsystem" 38. The DSP subsystem 38 receives the beamformed time series data from outputs 34a and 36a of the array processing subsystems 34 and 36, respectively, and uses standard digital signal processing methods to analyze the correlation between the two averaged, time varying signals (i.e., between the beamformed time series signals). The signal processing methods include standard methods familiar to practitioners of the art, such as cross-correlation, cross-spectra, coherence and phase properties between the time varying signals. Also, it will be appreciated that the signal processing methods employed with the system 10 and method of the present disclosure are not limited to analysis of only two time varying signals (auto- and cross-power spectral analyses). Rather, the signal processing methods chosen for use may employ polyspectral analyses wherein a mutual relationship among three or more array beamformed time series data are analyzed to determine the higher-order relationships amongst them (which, for three signals, includes calculations of the auto-bispectra, cross-bispectra, bicorrelations, auto-bicoherence spectrum, and so on). This may involve initially identifying if a correlation exists between the two time varying beam-steered signals.

The identification of the existence of a correlation between the two signals signifies that a common noise component is being received by both of the first and second arrays 26 and 30. Put differently, this would mean that a noise signal emanating from the first noise source 12 is similar in content to the signal emanating from the second noise source 14. This is because if the noise emanating from the two noise sources 12 and 14 is originating from a common source, in this example from the same common cause within the engine 20, then they will have a measurable degree of correlation within the noise measurement field 22.

The DSP subsystem 38 may also use suitable signal processing techniques to determine an approximate location within the external noise measurement field 22 at which the correlation between the two beamformed time series signals is at a maximum, as well as the spatial extent within the noise measurement field 22 of the correlation. This can be done (as described above with regard to FIG. 1A) by fixing the location and distribution of transducers in one array and then varying the location (and possibly the distribution of transducers) in a second array. It may be that, as the separation distance metric between the two arrays is increased, the correlation between the beam-steered time varying signals from both arrays continuously decreases.

When the level of correlation decreases below some defined value, the array separation distance at which this occurs can be used to define a maximum correlation length (or correlation distance) between the fixed and the separated arrays over which a relationship is defined to exist. For some combination of transducer distributions and array location (other than the case where the two arrays are identically co-located and the correlation is a maximum), there may be a result for which the correlation between arrays initially decreases as the second array's separation distance from the first array increases, but then the correlation increases with further increases (to a local maximum in correlation value) at larger array separation distances. For example, the spatial extent in this example might be the determination that the correlation exists along a wing flap trailing edge, or that the correlation exists within the jet mixing region downstream of the exhaust nozzle 16 of the jet engine 20. In the jet engine example, since it is known that jet noise radiates outwardly with a particular radiation pattern, for example containing two distinct lobes, then the first and second arrays 26 and 30 could be positioned along the known lobe radiation directions to determine the correlation, if any, between noise signals emanating along these paths, as well as to determine the extent of the regions over space for which the correlation exists.

Referring further to FIG. 1, the display system 40 may be used to graphically display correlation information to a user for analysis. The display system may comprise a liquid crystal display (LCD), a cathode ray tube (CRT) display or any form of display that is suitable for displaying a graphic representation of the correlation information.

Figure 2:
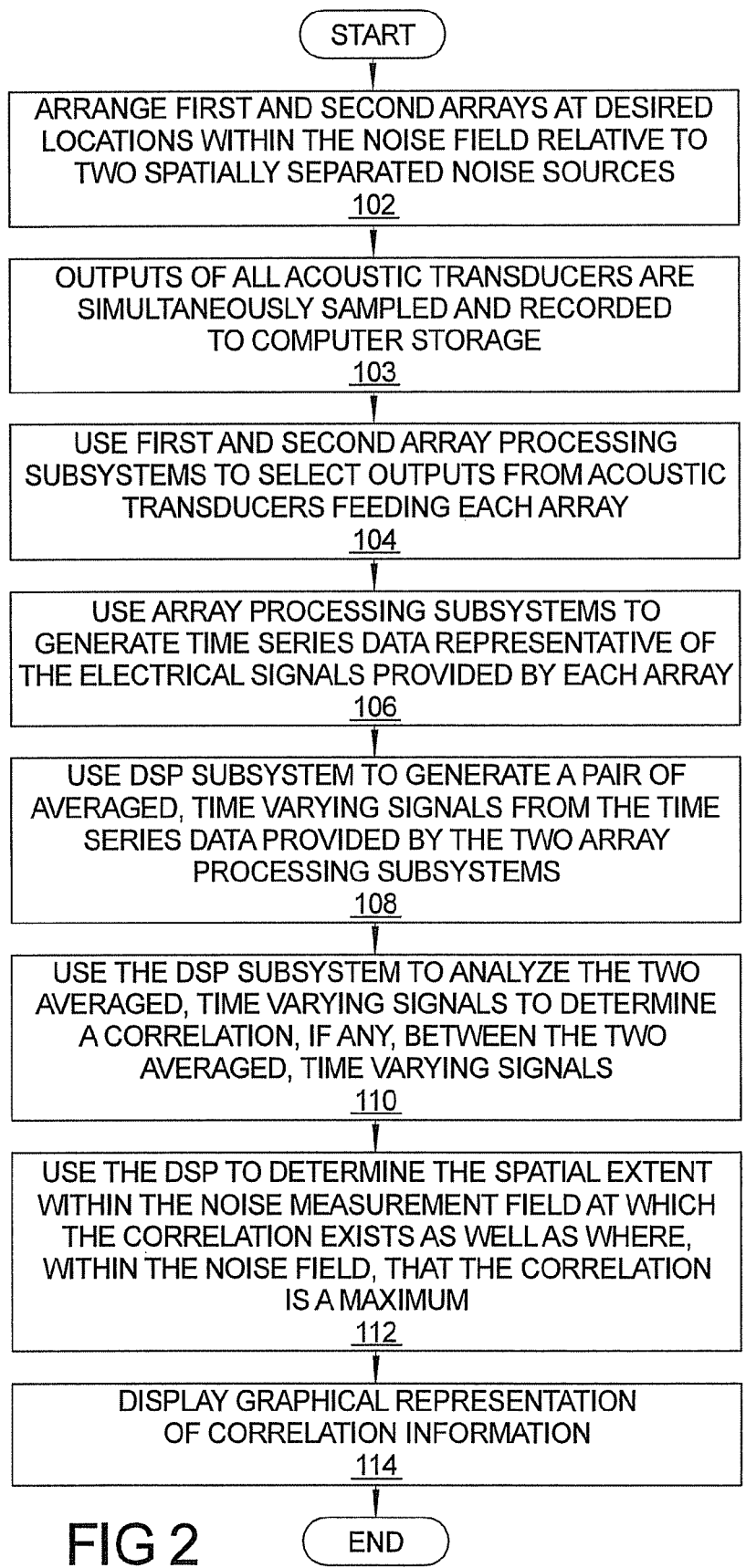
FIG. 2 is a flowchart setting forth basic operations performed by the system shown in FIG. 1 in analyzing noise emanating from two spatially separated locations.

Referring to FIG. 2, a flowchart 100 is shown that summarizes operation of the system 10. The transducers 24 are selected that will form each of the first array 26 and the second array 30, such that the arrays 26 and 30 are initially arranged within the noise field 22 at desired locations relative to the spatially separated noise sources 12 and 14, as indicated at operation 102. At operation 103, with the noise source being active, the outputs of all acoustic transducers 24 are simultaneously sampled and recorded to computer hard disk. However, as noted earlier, "real-time" systems could be used (that is, data would not have to be recorded to disk since the beamforming could be accomplished using a specially built "beamforming chassis". At operation 104 the first and second array processing subsystems 34 and 36 select the outputs from acoustic transducers 24 of the two spatially separated arrays 26 and 30 which have been recorded to computer disk at operation 103. At operation 106 the array processing subsystems 34 and 36 each take the signals from the arrays 26 and 30 and align their respectively received signals to produce time series data (i.e., a delayed-time representation data set) representative of the electrical signals being received from their associated arrays 26 and 30.

At operation 108 the DSP subsystem 38 generates a pair of averaged time varying (beamformed time series) signals from the time series data provided at the outputs 34a and 36a of the two array processing subsystems 34 and 36. At operation 110 the DSP subsystem 38 analyzes the two, time varying signals (i.e., the beamformed time series) to determine a correlation, if any, between the two averaged, time varying signals. At operation 112 the DSP subsystem 38 may determine the spatial extent within the noise measurement field 22 where the correlation exists as well as where, within the noise field, that the correlation is at a maximum. At operation 114 the correlation information may be displayed on the display system 40. Various commercially available software systems, for example MATLAB® offered by Mathworks of Natick, Mass., may be used for this purpose. This process may then be repeated one or more times by selecting different groups of transducers to form either of the first or second arrays 26 and 30.

The system 10 can be further enhanced if a pressure transducer is positioned at or near the source region of interest (e.g., at a wing flap edge, near the lip of a jet engine inlet or near the inner edge of the fan/primary exhaust nozzle exits of a jet engine). This would allow for additional levels of correlation analyses in both static and flight test measurements.

Referring to FIG. 3, a system 200 is shown for determining noise correlation but for a traveling mobile platform, in this example a flying jet aircraft 202. It will be appreciated that the system 200 makes use of the array processing subsystems 34 and 36, the DSP subsystem 38 and the display system 40, although these subsystems are not illustrated in FIG. 3. In the system 200 three arrays 204, 206 and 208 are arranged contiguously on the ground 210 along a known flight path of aircraft 202. Each array 204-208 may be formed by strategically positioned acoustic transducers 204a, 206a and 208a, respectively, such that each array forms a multi-arm log spiral phased array antenna or any such distribution of transducers appropriate for the article being tested. The arrays 204-208 provide the beamformed time series data necessary for determining the correlation, if any, between the noise signals radiating from and associated with the aircraft and measured by the arrays 206-208.

The configuration of the arrays 204-208 would provide the added benefit of obtaining multiple measurements of flight test aircraft noise for statistical analysis as opposed to a single measurement from arrays having co-located phase centers, since multiple, spatially separated (i.e., statistically independent) measurements would be acquired. In this embodiment the system 200 can also be used to determine array aperture size effects on the outputs of the arrays 204-208. Each of the arrays 204-208 may be further decomposed into smaller sets of subarrays. Correlations of the output between these additional subarrays of, for example, array 206a, can be used to study the effects of acoustic wave decorrelation across the arrays as the aperture size is varied.

It will also be appreciated that it is possible to create a "dome" or "sphere" surrounding the noise source, with transducers (i.e., microphones) "peppering" the inner surface so that correlations can be measured between any two array locations on the sphere.

The system 10 and method of the present disclosure thus enables noise correlation information to be obtained from a single or from spatially separated and/or distributed noise sources. A significant advantage of the present system 10 and method is that extraneous noise is filtered from the beamformed output time series from the array processing subsystems 34 and 36. This enables a correlation between noise signals from spatially separated sensors to be much more easily detected and analyzed by the DSP subsystem 38.

The present disclosure is inclusive of frequency domain beamforming/beam-steering and array signal processing methods for providing the averaged time varying signals from the first and second arrays. Mutual correlations among three (or more) arrays can be determined using polyspectral methods.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for detecting the presence of a noise signal within a noise measurement field, where the noise measurement field includes a noise signal emanating from a noise source at a specific known spatial location within the noise measurement field, and where the noise signal is mixed with extraneous noise existing within the noise measurement field, the method comprising:
   configuring a plurality of acoustic transducers arranged in first and second arrays to monitor the noise measurement field at a plurality of spatially separated locations, and where the acoustic transducers of each of said first and second arrays are configured such that a distance from each one of said acoustic transducers of each of said first and second arrays to said specific known spatial location of said noise source is known or assumed, so as to be able to detect the presence of noise at least at one specific, predetermined spatial location within the noise measurement field;
   sampling outputs from said acoustic transducers to generate time series data for each of said first and second arrays; and
   processing said time series data to identify whether said noise signal is present, said processing said time series data including analyzing said time series data and obtaining an averaged time varying signal for each of said first and second arrays, said averaged time varying signal from each of said first and second arrays having a characteristic that said noise signal emanating from said specific known spatial location within said noise measurement field is reinforced, and further such that said extraneous noise is substantially reduced or eliminated therefrom.

2. The method of claim 1, wherein the operation of sampling outputs from each of said acoustic transducers comprises simultaneously sampling said outputs.

3. The method of claim 1, wherein said plurality of acoustic transducers are spatially arranged to provide non-redundant acoustic transducer-to-acoustic transducer spacing between said plurality of acoustic transducers to inhibit spatial aliasing.

4. The method of claim 1, wherein said plurality of acoustic transducers form first and second beamformed, acoustic phased array antennas.

5. The method of claim 1, wherein using first and second arrays comprises using a first group of acoustic transducers forming a first acoustic phased array antenna and a second group of acoustic transducers forming a second phased array antenna.

6. The method of claim 5, wherein using said first and second acoustic phased array antennas comprises using first and second acoustic phased array antennas having said first and second groups of acoustic transducers arranged in a desired orientation.

7. The method of claim 6, wherein using said first and second acoustic phased array antennas comprises:
   analyzing said averaged time varying signals from each of said first and second acoustic phased array antennas to identify whether said noise signal is present in both of said averaged time varying signals.

8. The method of claim 7, further comprising analyzing said averaged time varying signals to determine a spatial location at which said noise signal is emanating from.

9. The method of claim 8, further comprising analyzing said averaged time varying signals to determine a spatial extent of noise signal correlation within said noise measurement field.

10. A method for determining a relationship between acoustic noise signals originating from acoustic waves radiating from multiple noise sources, where at least one of the multiple noise sources are located within a noise measurement field, and where a specific spatial location within the noise measurement field of at least one of the multiple noise sources is known in advance, the method comprising:
   configuring a plurality of acoustic transducers arranged as acoustic phased array antennas in first and second arrays to monitor the noise measurement field at a plurality of spatially separate locations within the noise measurement field, and such that each of said acoustic transducers is positioned at a known or assumed distance from said at least one of the multiple noise sources, so as to be able to detect the presence of noise at least at the one specific, spatial location within the noise measurement field;
   sampling electrical signals output from said acoustic transducers and generating time varying signals therefrom;
   processing said time varying signals by aligning the signals originating at the same time from the specific spatial location into a delayed-time representation data set and generating an averaged time varying signal from each respective delayed-time representation data set from each of said first and second arrays;
   using a digital signal processor to receive and analyze said averaged time varying signals from each of said first and second arrays to determine a correlation between noise signals being monitored by said first and second arrays.

11. The method of claim 10, wherein the operation of sampling time varying signals generated by each of said acoustic transducers comprises simultaneously sampling an output from each of said acoustic transducers.

12. The method of claim 10, wherein said acoustic transducers of said first array are spatially arranged to provide non-redundant acoustic transducer-to-acoustic transducer spacing between said acoustic transducers to inhibit spatial aliasing, and wherein said acoustic transducers of said second array are also spatially arranged to provide non-redundant acoustic transducer-to-acoustic transducer spacing between said acoustic transducers to inhibit spatial aliasing.

13. The method of claim 10, wherein using acoustic transducers arranged in first and second arrays further comprises using first and second transducers arranged in a desired orientation.

14. The method of claim 10, wherein using acoustic transducers arranged in first and second arrays comprises using beam steered acoustic phased array antennas.

15. The method of claim 10, further comprising displaying a graphic representation of correlation information obtained from said digital signal processor.

16. A system for determining a relationship between acoustic noise signals originating from acoustic waves radiating from multiple noise sources, where the multiple noise sources are located within a noise measurement field, and where spatial locations of specific first and second ones of the multiple noise sources within the noise measurement field are known in advance, the system comprising:

a plurality of acoustic transducers arranged in first and second arrays to monitor the noise measurement field at a plurality of spatially separate locations within the noise measurement field, and where a distance from each one of said acoustic transducers of said first array to the first one of said multiple noise sources is known or assumed, and wherein a distance from each one of said acoustic transducers of said second array to the second one of said multiple noise sources is known or assumed;

the acoustic transducers adapted to generate electrical signals in response to reception of acoustic signals present within the noise measurement field;

an array processing subsystem including beamforming and array signal processing algorithms and being responsive to an output from each of said acoustic transducers, to generate time series data therefrom; and a signal processing subsystem adapted to process said time series data and to generate a first averaged time varying signal associated with an output from said first array, and a second time varying signal associated with an output from said second array, and further adapted to analyze said first and second averaged time varying signals to determine a correlation between noise radiating from said spatial locations of said first and second ones of the multiple noise sources emanating within the noise measurement field.

17. The system of claim 16, wherein said acoustic transducers are arranged along a longitudinal path.

18. The system of claim 16, further comprising a display responsive to an output of said signal processing subsystem for graphically displaying correlation information.

\* \* \* \* \*